(12) United States Patent
Shagam et al.

(10) Patent No.: US 7,966,557 B2
(45) Date of Patent: Jun. 21, 2011

(54) GENERATING IMAGE-BASED REFLOWABLE FILES FOR RENDERING ON VARIOUS SIZED DISPLAYS

(75) Inventors: Joshua Shagam, Seattle, WA (US); Frederick Ziya Ramos Akalin, Seattle, WA (US); Robert L. Goodwin, Mercer Island, WA (US); Adam Brian Coath, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1338 days.

(21) Appl. No.: 11/392,248

(22) Filed: Mar. 29, 2006

(65) Prior Publication Data

US 2007/0234203 A1    Oct. 4, 2007

(51) Int. Cl.
G06F 17/00 (2006.01)
G06K 9/48 (2006.01)

(52) U.S. Cl. ........ 715/243; 715/204; 715/245; 715/247; 382/173; 382/176; 382/241

(58) Field of Classification Search .......... 715/200–205, 715/207–210, 226, 227, 231–234, 243–247, 715/254, 255, 273, 700, 760, 761, 762, 229, 715/238, 252, 256, 788, 800, 801, 815; 382/165, 382/173, 176, 177, 180, 195, 224, 241, 256, 382/291, 292, 293, 321
See application file for complete search history.

(56) References Cited

U.S. PATENT DOCUMENTS

| | | | |
|---|---|---|---|
| 4,741,045 A * | 4/1988 | Denning | 382/178 |
| 5,029,107 A | 7/1991 | Lee | |
| 5,285,526 A | 2/1994 | Bennett et al. | |
| 5,590,257 A | 12/1996 | Forcier | |
| 5,671,438 A | 9/1997 | Capps et al. | |
| 5,774,580 A | 6/1998 | Saitoh | |
| 5,784,487 A | 7/1998 | Cooperman | |

(Continued)

FOREIGN PATENT DOCUMENTS

EP    1343095 A2    9/2003

(Continued)

OTHER PUBLICATIONS

Lin, X., Header and Footer Extraction by Page-Association, Hewlett-Packard Company, May 6, 2002, Palo Alto, California, U.S., pp. 1-8.

(Continued)

*Primary Examiner* — Maikhanh Nguyen
(74) *Attorney, Agent, or Firm* — Knobbe, Martens, Olson & Bear LLP

(57) ABSTRACT

A computer-implemented method is provided for creating an image-based reflowable file. The image-based reflowable file is configured to automatically adapt itself to be rendered on various sized displays and windows, by permitting the lines of reflow objects to "reflow" according to the given size of a display or window. The method includes receiving. First, an image of content having reflow objects and identifying bounding regions to enclose a reflow object contained in the image. A reflow object baseline for each of the reflow objects is then identified and the position of each of the bounding regions containing the reflow objects is determined, relative to the image and also relative to the corresponding reflow object baseline. The size of each of the bounding regions is then determined, for example in terms of width and height, and stored.

17 Claims, 11 Drawing Sheets

U.S. PATENT DOCUMENTS

| | | | |
|---|---|---|---|
| 5,850,490 | A | 12/1998 | Johnson |
| 5,860,074 | A | 1/1999 | Rowe et al. |
| 5,907,631 | A | 5/1999 | Saitoh |
| 5,978,819 | A | 11/1999 | Berstis |
| 6,002,798 | A | 12/1999 | Palmer et al. |
| 6,032,163 | A | 2/2000 | Tou et al. |
| 6,256,610 | B1 | 7/2001 | Baum |
| 6,377,704 | B1 | 4/2002 | Cooperman |
| 6,487,570 | B1 | 11/2002 | Forcier |
| 6,510,243 | B1 | 1/2003 | Ikeda |
| 6,766,495 | B1 | 7/2004 | Bates et al. |
| 6,915,484 | B1 * | 7/2005 | Ayers et al. ............ 715/234 |
| 6,956,587 | B1 * | 10/2005 | Anson ............ 345/649 |
| 7,171,061 | B2 * | 1/2007 | Sarkar et al. ............ 382/309 |
| 7,213,035 | B2 | 5/2007 | Ornstein et al. |
| 7,219,309 | B2 | 5/2007 | Kaasila et al. |
| 7,272,258 | B2 * | 9/2007 | Berkner et al. ............ 382/176 |
| 7,362,311 | B2 * | 4/2008 | Filner et al. ............ 345/169 |
| 7,392,472 | B2 | 6/2008 | Simard et al. |
| 7,412,647 | B2 * | 8/2008 | Sellers et al. ............ 715/253 |
| 7,433,548 | B2 | 10/2008 | Goodwin et al. |
| 7,460,710 | B2 * | 12/2008 | Coath et al. ............ 382/180 |
| 7,469,388 | B1 | 12/2008 | Baudisch et al. |
| 7,486,628 | B1 | 2/2009 | Brisebois et al. |
| 7,586,655 | B1 * | 9/2009 | Uhlik et al. ............ 358/497 |
| 2002/0052898 | A1 | 5/2002 | Schilit et al. |
| 2002/0191847 | A1 * | 12/2002 | Newman et al. ............ 382/176 |
| 2003/0014445 | A1 | 1/2003 | Formanek et al. |
| 2003/0126558 | A1 | 7/2003 | Griffin |
| 2003/0128234 | A1 | 7/2003 | Brown et al. |
| 2003/0135649 | A1 | 7/2003 | Buckley et al. |
| 2004/0004641 | A1 | 1/2004 | Gargi |
| 2004/0103371 | A1 | 5/2004 | Chen et al. |
| 2004/0139384 | A1 | 7/2004 | Lin |
| 2004/0146199 | A1 | 7/2004 | Berkner et al. |
| 2004/0202352 | A1 | 10/2004 | Jones et al. |
| 2004/0205568 | A1 | 10/2004 | Breuel et al. |
| 2005/0125549 | A1 | 6/2005 | Katayama |
| 2005/0128516 | A1 | 6/2005 | Tomita |
| 2005/0234893 | A1 | 10/2005 | Hirsch |
| 2006/0005116 | A1 | 1/2006 | Ferguson et al. |
| 2006/0181742 | A1 | 8/2006 | Lech et al. |
| 2006/0227153 | A1 * | 10/2006 | Anwar et al. ............ 345/660 |
| 2006/0282838 | A1 | 12/2006 | Gupta et al. |
| 2007/0061704 | A1 | 3/2007 | Simova et al. |
| 2007/0112810 | A1 | 5/2007 | Jonsson |
| 2008/0267535 | A1 | 10/2008 | Goodwin et al. |

FOREIGN PATENT DOCUMENTS

| | | |
|---|---|---|
| JP | 2004005453 A | 1/2004 |
| JP | 2004532430 T | 10/2004 |
| WO | WO 02/089105 A2 | 11/2002 |

OTHER PUBLICATIONS

Taghva et al., The Impact of Running Headers and Footers on Proximity Searching, Information Science Research Institute, University of Nevada, 2004, Las Vegas, Nevada, 5 pages.

PDF Reference Fifth Edition, Adobe Portable Document Format Version 1.6, Chapter 5.9, Adobe Systems Incorporated, 1985-2004, pp. 440-446.

Boychuk, B., Shortcovers for iPhone Review, Macworld.com, http://www.macworld.com/article/141540/2009/07/shortcovers.htrnl, Jul. 6, 2009, pp. 3.

Breuel, T.M., et al., Reflowable Document Image, Chapter 1, pp. 1-14, <http://citeseerx.ist.psu.edu/viewdoc/download?doi=10.1.1.12.9828&rep=rep1&type=pdf> [retrieved on Jan. 25, 2011], Nov. 18, 2002.

Cattoni, R., et al., Geometric Layout Analysis Techniques for Document Image Understanding: A Review, Retrieved from the Internet: URL: http://tev.fbk.eu/people/modena/Papers/DocLayout_ITC-irst-TR9703-09.pdf [retrieved on Jan. 25, 2011].

Montanés, E., et al. , Towards Automatic and Optimal Filtering Levels for Feature Selection in Text Categorization, Advances in Intelligent Data Analysis VI, Sep. 2005, pp. 239-248.

* cited by examiner

GENERATING IMAGE-BASED REFLOWABLE FILES FOR RENDERING ON VARIOUS SIZED DISPLAYS

FIELD OF THE INVENTION

The present invention is directed to processing of digital images, and more particularly to processing and displaying images of content having text therein.

BACKGROUND OF THE INVENTION

As the use of computers and computer-based networks continues to expand, content providers are preparing and distributing more and more content in electronic form. This content includes traditional media such as books, magazines, newspapers, newsletters, manuals, guides, references, articles, reports, documents, etc., that exist in print, as well as electronic media in which the aforesaid content exists in digital form or is transformed from print into digital form through the use of a scanning device. The Internet, in particular, has facilitated the wider publication of digital content through downloading and display of images of content. As data transmission speeds increase, more and more images of pages of content are becoming available online. A page image allows a reader to see the page of content as it would appear in print.

Some readers, however, may have computing devices with displays, which are sized differently from the display for which a page image is originally formatted. Also, some readers may wish to view the text in a page image in a varyingly-sized window within a display. In one embodiment, a consent provider can generate and maintain different versions of the same content to accommodate for various display embodiments. This approach; however, can be inefficient and costly. The present invention is directed to providing a page image file, which is configured to automatically adapt itself to be rendered on displays or windows of various sizes.

SUMMARY OF THE INVENTION

In accordance with various exemplary embodiments, the present invention offers a computer-implemented method, system, and computer-accessible medium having instructions encoded thereon, for creating an image-based reflowable file. The image-based reflowable file is configured to be rendered on various sized displays and windows, by permitting the lines of text to "reflow" according to the given size of a display or window. As used herein, the "reflow" of lines refers to changing line segmentation in text.

The method for creating an image-based reflowable file generally includes six steps. First, an image of content having text is received, for example, by scanning in the image of the text. Second, a bounding region is found for each of the reflow objects contained in the text. Third, a reflow object baseline is found for each of the reflow objects in the text. Briefly, a reflow object baseline for a word refers to a line that coincides with the bottom lines of the majority of characters appearing in the word. Fourth, the position of each bounding region containing a reflow object is determined relative to the image and also relative to its corresponding reflow object baseline. For example, the position of a bounding region relative to its corresponding reflow object baseline may be defined as an offset distance between one side of the bounding region and the reflow object baseline. Fifth, the size of each of the bounding regions is determined. In one aspect, the size of the bounding region is defined by its width and height. Sixth, the size and position of each of the bounding regions are stored. The image-based reflowable file, which is created according to a method of the present invention, therefore, defines the size and the position of each of the bounding regions, each being further associated with a reflow object baseline, which contain the reflow objects that appear in the received image having text.

In accordance with further embodiments of the present invention, an image-based reflowable file created in accordance with a method of the present invention may then be rendered on displays or windows of various sizes. In one embodiment, a method of rendering an image-based reflowable file on a display or window of a given size generally includes six steps. First, an image-based reflowable file comprising an image including text is received. In the file, each reflow object forms a sub-image and is defined in a bounding region, and the size and the position of each bounding region as appearing in the image are defined. Second, the size of the display or window is determined. If the display/window size is the same as the original display/window size for which the image-based reflowable file has been created, then the file may be rendered using the size and the position of each of the bounding regions "as is." Specifically, the bounding regions (and thus the reflow objects contained therein) may be rendered on the display/window according to their positions and sizes as defined in the file.

If, on the other hand, the display/window size is in any way different from the original display/window size, then, in the third step, the number of bounding regions that fit horizontally per each horizontal line on the display, with a predefined minimum spacing between adjacent bounding regions, is determined based on the size of each bounding region. For example, given the horizontal dimension of the display/window, and the width dimension of each of the bounding regions, it can be determined how many bounding regions will fit horizontally per each horizontal line. Fourth, the horizontal position of each bounding region relative to each horizontal line is determined. Fifth, the vertical position of each of the bounding regions that fit horizontally per each horizontal line is determined based on the size of the bounding region. For example, given the vertical dimension of the display/window and the height dimension of each of the bounding regions, it can be determined how to vertically and consistently space apart the bounding regions that fit horizontally along a plurality of horizontal lines on the display. As a further specific example, the determination of the vertical position of each bounding region can be accomplished by first determining the vertical position of each of the plurality of horizontal lines based on the size of the display (e.g., by dividing the vertical dimension of the display by a minimum spacing) and by determining the vertical position of each bounding region so as to align the reflow object baseline of the bounding region with the corresponding horizontal line. In the sixth step, the bounding regions, and hence the sub-images of the reflow objects contained therein, are rendered according to the determined horizontal and vertical positions of the bounding regions.

In accordance with a further aspect of the present invention, an image-based reflowable file created in accordance with a method of the present invention may be rendered on a display/window according to a zoom level requested by a reader. In this embodiment, the step of determining the number of bounding regions that fit horizontally per each horizontal line consists of first resizing the bounding regions according to the display zoom level as requested, and then determining the number of resized bounding regions that fit horizontally per each horizontal line. The step of determining the horizontal position of each bounding region relative to each horizontal line similarly consists of determining the horizontal position of each resized bounding region relative to the horizontal line. The step of determining the vertical position of each of the bounding regions that fit horizontally per each horizontal line consists of determining the vertical position of each resized bounding region so that the resized reflow objects in the resized bounding regions that fit horizontally along a plurality of horizontal lines are consistently spaced apart vertically. Lastly, the step of rendering the sub-images of the reflow objects consists of rendering the sub-images of the reflow objects defined in the resized bounding regions according to the determined horizontal and vertical positions of the resized bounding regions. For example, if a zoom-up is requested, the size of each bounding region is enlarged, and the resized (enlarged) bounding regions, and hence the resized (enlarged) reflow objects contained therein, are rendered.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The present invention is directed to a computer-implemented method, system, and computer-accessible medium having instructions encoded thereon, for creating an image-based reflowable file. The image-based reflowable file is configured to automatically adapt itself to be rendered on various output media, such as various sized displays and windows, printed media, etc. More specifically, the image-based reflowable file permits lines of reflow objects to reflow according to the given dimensions and limitations of a selected output medium, such as the size of a display or window. It should be understood that, in the context of the present invention, the term "reflow objects" includes a selection of one or more letters, characters, symbols, numbers, formulas, graphics, line drawings, table borders, textual content, etc., that may be used to represent information in an image. In an illustrative embodiment, identifiable content, such as words, can be represented as a single reflow object. Alternatively, identifiable content can also be represented as a number of reflow objects. As described above, reflow relates to the modification of line segmentation for the reflow objects.

The following detailed description provides exemplary implementations of the invention. Although specific system configurations and flow diagrams are illustrated, it should be understood that the examples provided are not exhaustive and do not limit the invention to the precise forms disclosed. Persons having ordinary skill in the field of computers and digital imaging will recognize components and process steps described herein that may be interchangeable with other components or steps, or combinations of components or steps, and still achieve the benefits and advantages of the present invention. It should also be understood that the following description is presented largely in terms of logic and operations that may be performed by conventional computer components. These computer components, which may be grouped in a single location or distributed over a wide area, generally include computer processors, memory storage devices, display devices, input devices, etc. In circumstances where the computer components are distributed, the computer components are accessible to each other via communication links.

In the following description, numerous specific details are set forth in order to provide a thorough understanding of the invention. It will be apparent to one skilled in the art, however, that the invention may be practiced without some or all of these specific details. In other instances, well-known process steps have not been described in detail in order not to unnecessarily obscure the invention.

Figure 1:
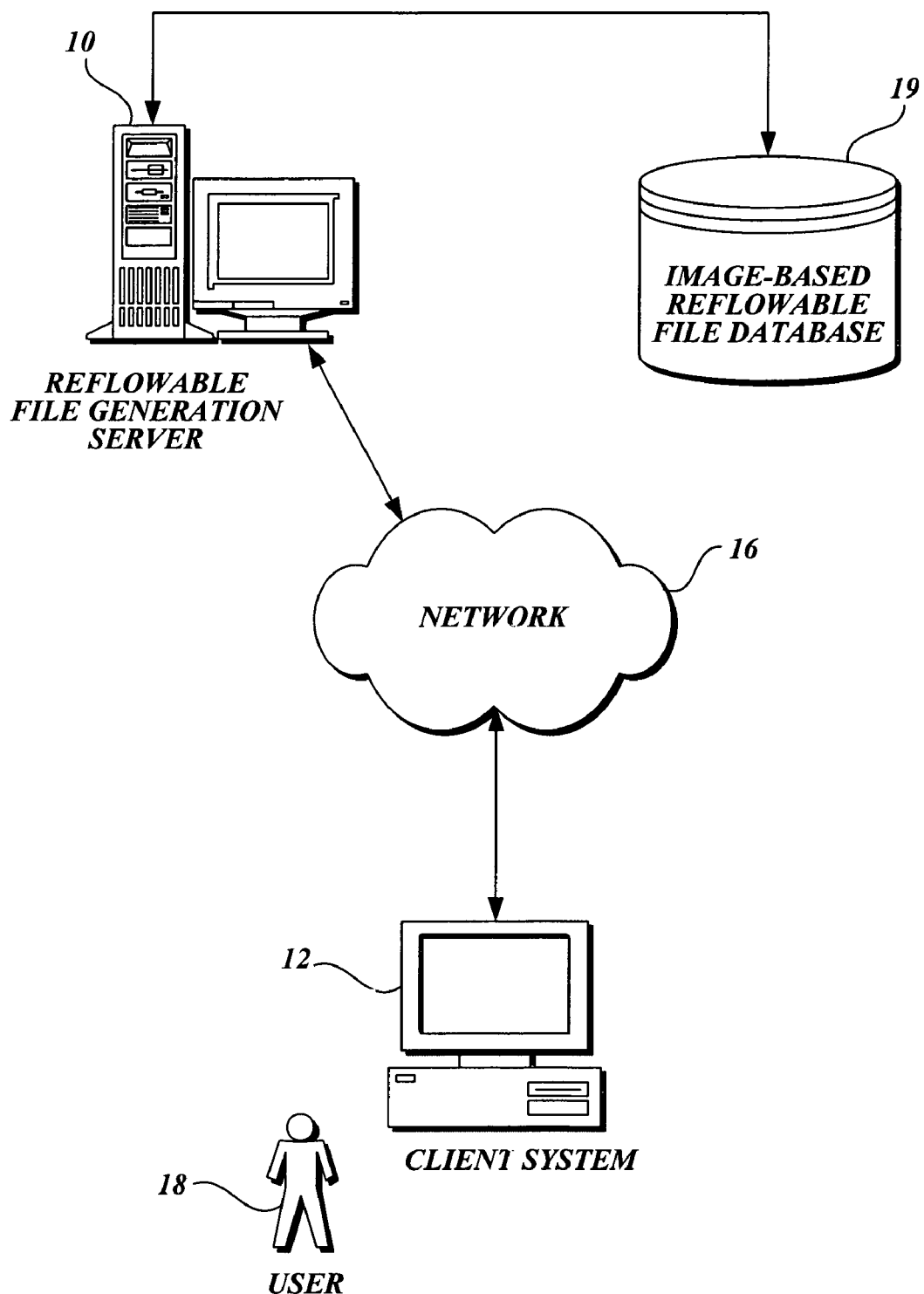
FIG. 1 is a pictorial diagram showing an exemplary computing environment in which embodiments of the invention may be implemented.

FIG. 1 provides an exemplary overview of one computing environment in which embodiments of the invention may be implemented. The depicted environment includes a reflowable file generation server 10 and a client system 12 communicatively connected by a network 16, such as the Internet. The client system 12 is shown associated with a user 18. As further depicted in FIG. 1, the reflowable file generation server 10 includes or communicates with an image-based reflowable file database 19. In the illustrated embodiment, the client system 12 is configured to receive one or more image-based reflowable files from the reflowable file generation server 10 via the network 16 and render them on an output media, such as a display screen. In an illustrative embodiment, a suitable viewer (e.g., Web browser) application is operating on the client system 12 to cause it to render the image-based reflowable files on a computer display.

The network 16 in FIG. 1 may be a Local Area Network ("LAN"), a larger network such as a Wide Area Network ("WAN"), or a collection of networks, such as the Internet. Protocols for network communication, such as TCP/IP, are well known to those skilled in the art of computer networks. The present invention is described herein as using the Internet. Persons of ordinary skill in the art will recognize that the invention may also be used in other interactive environments, such as local or wide area networks that connect servers storing related documents and associated files, scripts, and databases, or broadcast communication networks that include set-top regions or other information appliances providing access to audio or video files, documents, scripts, databases, etc.

Figure 2A:
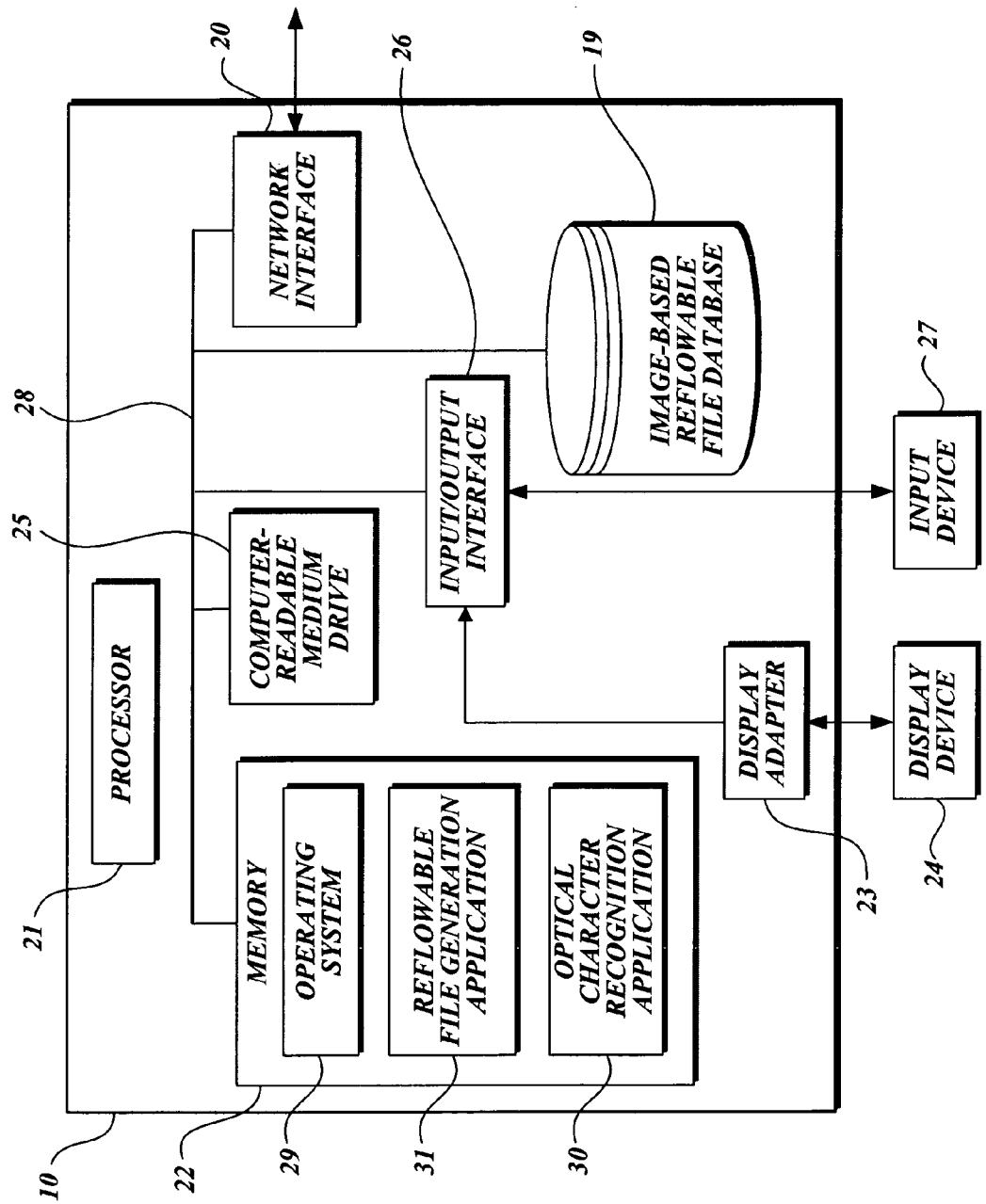
FIG. 2A is a functional block diagram showing some of the components that may be incorporated in a reflowable file generation server as depicted in FIG. 1.
Figure 2B:
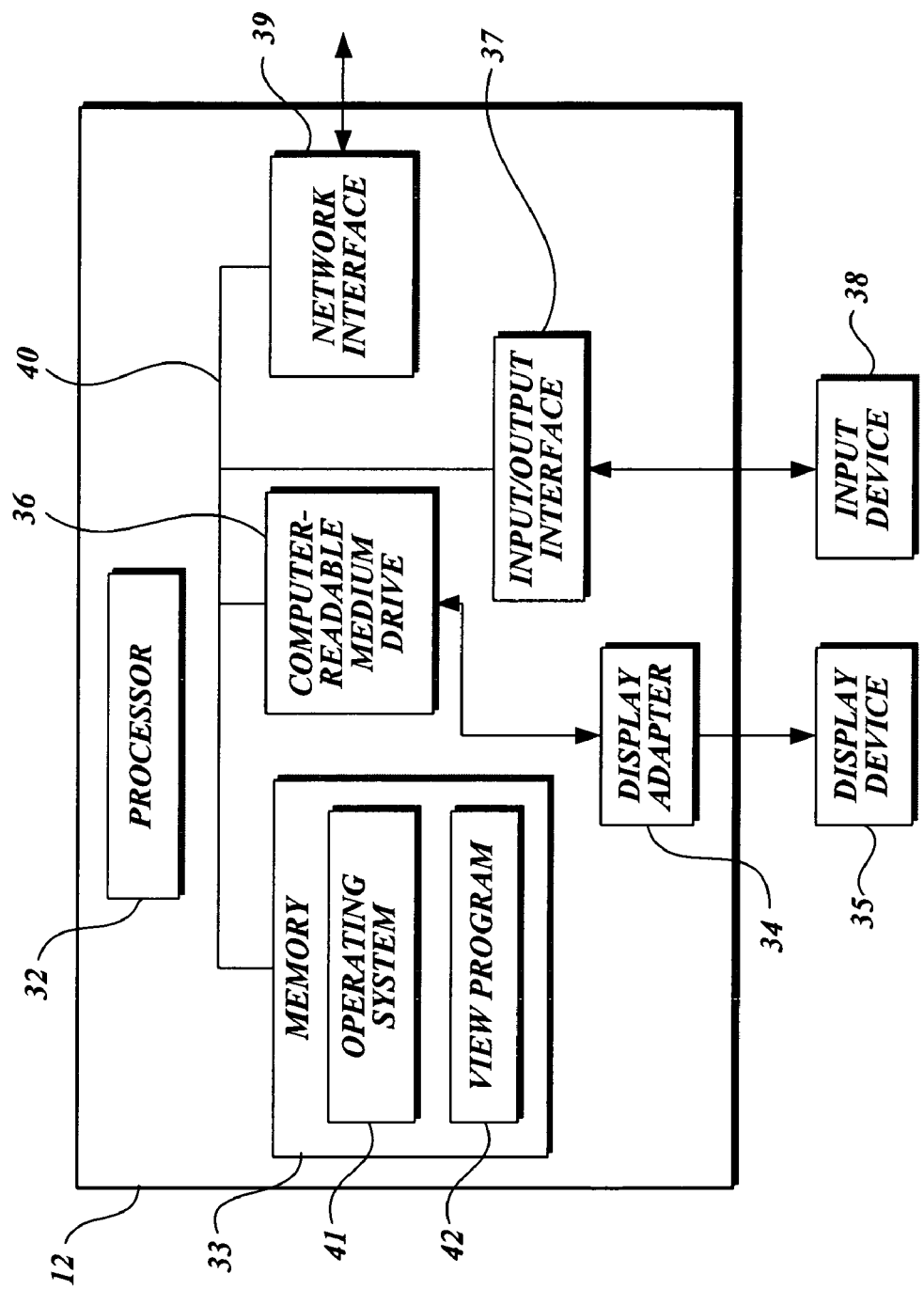
FIG. 2B is a functional block diagram showing some of the components that may be incorporated in a client system as depicted in FIG. 1.

FIGS. 2A and 2B depict exemplary computer architectures for the reflowable file generation server 10 and the client system 12 shown in FIG. 1. The exemplary computer architectures for the reflowable file generation server 10 (FIG. 2A) and the client system 12 (FIG. 2B) can be used to implement one or more embodiments of the present invention. Of course, those skilled in the art will appreciate that the reflowable file generation server 10, as well as the client system 12, may include greater or fewer components than those shown in FIGS. 2A and 2B.

The reflowable file generation server 10 in FIG. 2A connects to the network 16 (FIG. 1) using a network interface 20. The network interface 20 enables the reflowable file generation server 10 to communicate data, control signals, data requests, and other information via the computer network 16. For instance, the reflowable file generation server 10 may receive a file containing digital images of content having reflow objects therein from the network 16 via the network interface 20.

The reflowable file generation server 10 further includes a processor 21, a memory 22, a computer-readable medium drive 25 (e.g., disk drive), and an input/output interface 26, all communicatively connected to each other and to the network interface 20 by a communication bus 28. The display device 24 may be a typical display device, such as a computer display (e.g., CRT or LCD screen), television screen, etc. The input/output interface 26 is configured to communicate with one or more external devices, such as an input device 27 to capture images of content having text therein. The input device 27 may be any device capable of capturing images including but not limited to a video camera, scanner, digital camera, copier, scanning pen, etc. The input/output interface 26 may also be configured to communicate with one or more external output devices, such as display adapter 23. Display adapter 23 provides signals to a display device 24 that enables a user to observe and interact with the reflowable file generation server 10. Additionally, the input/output interface 26 may also be configured to communicate with various printing adapters (not shown) to render the reflowable files on printed media. The input/output interface 26 may also communicate with external devices not shown in FIG. 2A, such as a mouse, keyboard, pen, or other device that can be operated by a user.

The processor 21 is configured to operate in accordance with computer program instructions stored in a memory, such as the memory 22. Program instructions may also be embodied in a hardware format, such as a programmed digital signal processor. Furthermore, the memory 22 may be configured to store digital images of content having reflow objects therein for processing, transmission, and display in accordance with the present invention.

The memory 22 generally comprises RAM, ROM, and/or permanent memory. The memory 22 stores an operating system 29 for controlling the general operation of the reflowable file generation server 10. The operating system 29 may be a general-purpose operating system such as a Microsoft® operating system, UNIX® operating system, or Linux® operating system. The memory 22 further stores an optical character recognition (OCR) application 30 comprised of program code and data designed to analyze digital images containing reflow objects therein. Those of ordinary skill in the art will recognize a wide variety of algorithms and techniques capable of analyzing and recognizing reflow objects in an image. For purposes of the present invention, however, it is not necessary that the algorithms and techniques actually recognize the individual characters or symbols or interpret their meanings, as achieved by many OCR routines. Rather, an OCR-like process may be used, in which limited information such as the baselines and the location and size of characters in a digital image is ascertained. As used herein, the term "character recognition" refers to all forms of character recognition using scanners and computer algorithms. Examples of commercially-available OCR software include OmniPage Pro™ from ScanSoft, Inc., and FineReader™ from SmartLink Corporation. The memory 22 additionally stores program code and data providing a reflowable file generation application 31. The reflowable file generation application 31 contains program code and data for processing a digital image received via the network interface 20, the input/output interface 26, etc., to generate an image-based reflowable file, which can then be sent to the image-based reflowable file database 19 for storage.

FIG. 2B depicts an exemplary computer architecture for the client system 12 shown in FIG. 1. The client system 12 in FIG. 2B includes several components that may operate similarly to the components of like names described above in regard to the reflowable file generation server 10. The client system 12 includes a processor 32 in communication with a memory 33, a display adapter 34 coupled with a display device 35, a computer-readable medium drive 36, an input/output interface 37 coupled to an input device 38, and a network interface 39, all communicatively connected by a bus 40.

The memory 33, as shown, stores an operating system 41 that controls the general operation of the client system 12. The memory additionally stores a viewer program 42, such as a Web browser program. In accordance with various exemplary embodiments of the present invention, the processor 32, in connection with the viewer program 42 and the display adapter 34, adaptively renders an image-based reflowable file on the display device 35 regardless of the particular size of the display device 35. In the present description, the term "display" and the term "window" may be used interchangeably, and further the term "display" may be used to encompass both a display (or screen) and a window.

Figure 3A:
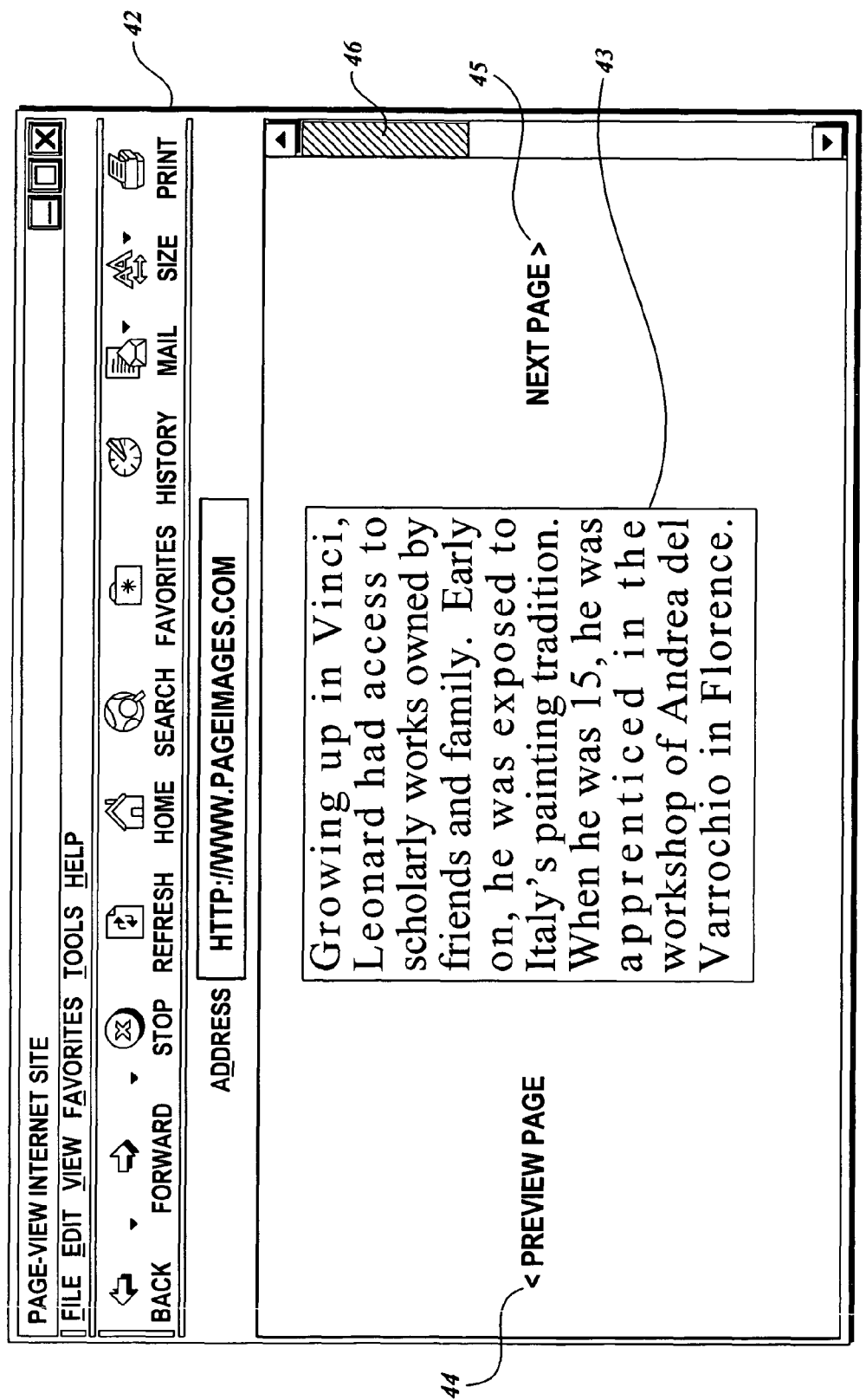
FIG. 3A is a pictorial view of a screen display in which a digital image of a page of content having textual content therein is displayed.

FIG. 3A is a pictorial view of a screen display in which a digital image of a page of content having reflow objects therein is displayed. Specifically, FIG. 3A illustrates a display (or window) 43 of a computing device, such as the client system 12, which is operating the viewer program 42. In the illustrated example, the display 43 shows an image of a complete page from a book. The viewer program 42 further displays various selectable controls, such as "Previous Page" 44 and "Next Page" 45 that permit a user to browse through the pages of content being displayed, and a scroll bar 46 that permits a user to scroll up or down the content within the display 43.

Figure 3C:
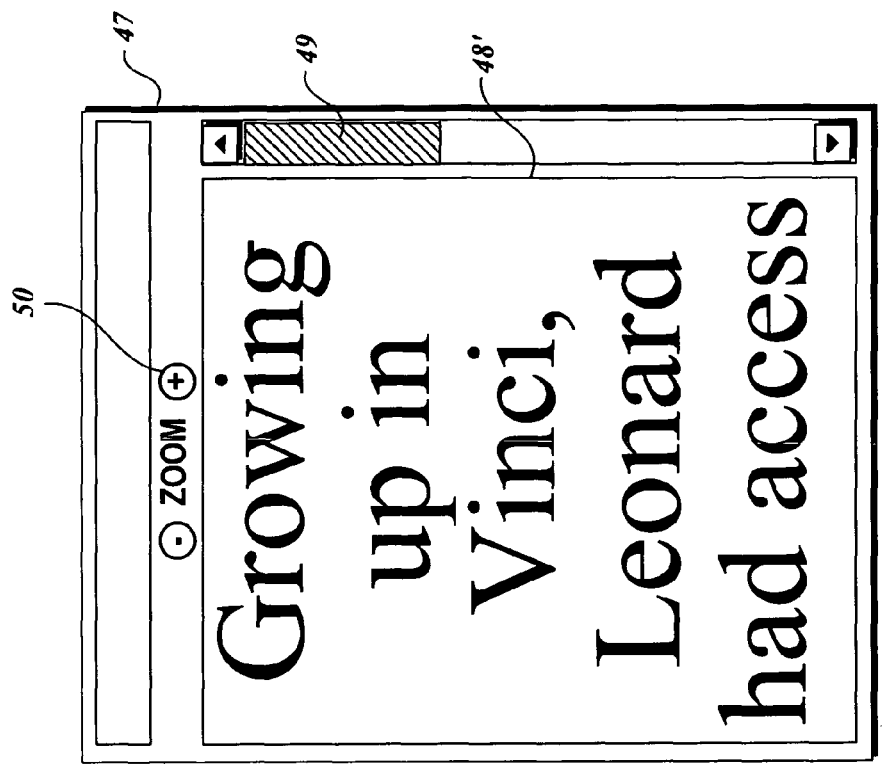
FIG. 3C is a pictorial view of a viewer program rendering the content of FIG. 3B, and illustrating a large scale zoom.
Figure 3B:
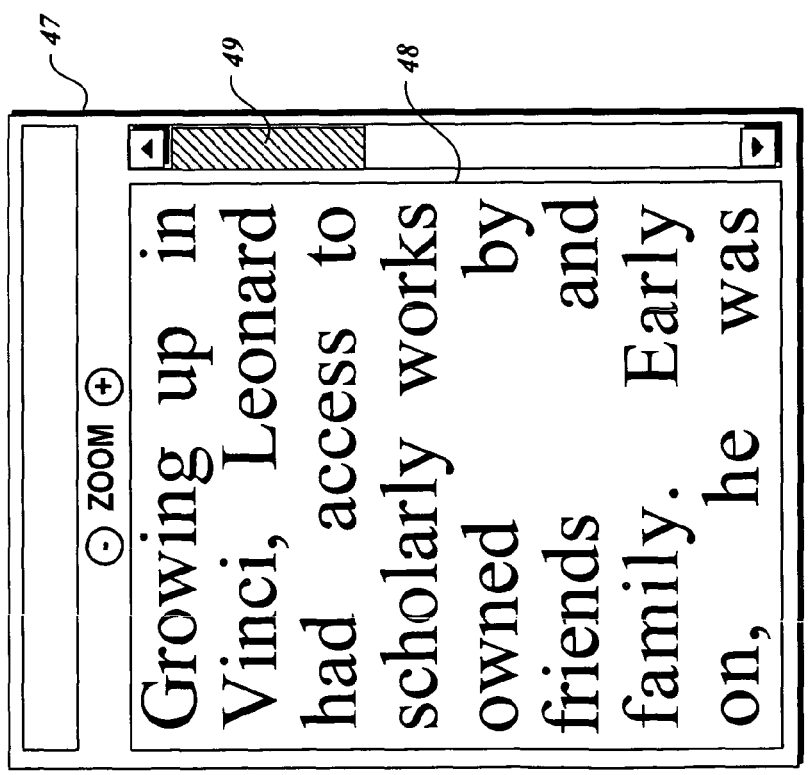
FIG. 3B is a pictorial view of a viewer program rendering the content of FIG. 3A, on a smaller-sized display/window.

FIG. 3B different configuration depicts a screen display of a computing device, which may also be operating a viewer program 47. The display 48 in FIG. 3B is smaller in both height and width dimensions as compared to the display 43 in FIG. 3A. According to the present invention, an image-based reflowable file may be adaptively rendered on various sized displays and windows. In FIG. 3B, for example, the same reflow objects, e.g., textual content, as in the display 43 of FIG. 3A is automatically "reflowed" and rendered on the smaller display 48. Specifically, the first line in the original display 43 of FIG. 3A included "Growing up in Vinci," which is reflowed so that only the "Growing up in" portion appears in the first line in the smaller display 48, with "Vinci," moved to the beginning of the second line in the smaller display 48. Because the display 48 is smaller than the original display 43 of FIG. 3A, the viewer program 47 may further preferably include a scroll bar 49 to permit the user to scroll up and down the content within the smaller display 48 to view the entire textual content as included in the original display 43 of FIG. 3A.

FIG. 3C depicts a display (window) 48', which is relatively the same size as the display 48 of FIG. 3B but shows the same textual content as in the display 48 of FIG. 3B in a larger scale. For example, a user may have selected a zoom up "+" control button 50 to enlarge the displayed content as previously shown in the display 48 of FIG. 3B. Then, in FIG. 3C, the same reflow objects as in the display 48 of FIG. 3B, which is now enlarged, is automatically reflowed and rendered on the display 48' in the enlarged scale. Specifically, the first line in the display 48 of FIG. 3B included "Growing up in," which is enlarged and reflowed so that only the enlarged "Growing" portion now appears in the first line in the display 48', with similarly enlarged "up in" moved to the second line in the display 48'. As before, the scroll bar 49 may be used to permit the user to scroll up and down the content within the display 48' to view the entire textual content as included in the original display 43 of FIG. 3A.

Figure 3D:
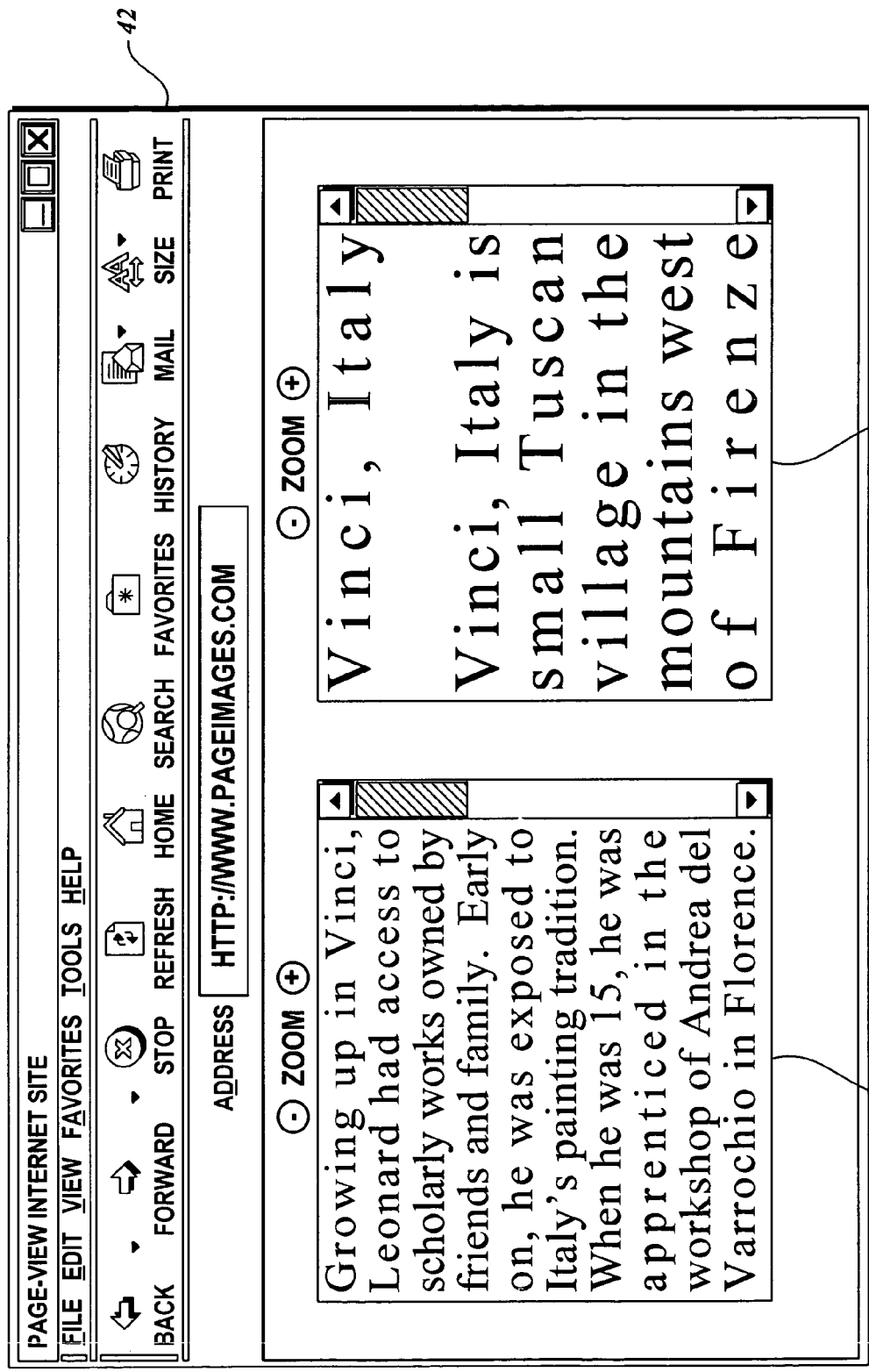
FIG. 3D is a pictorial view of a browser program depicting a Web page in which two digital images of textual content are individually rendered in accordance.

FIG. 3D depicts a further embodiment of the present invention may be implemented. Specifically, FIG. 3D illustrates a viewer program 42 including a first display (window) 52 and a second display (window) 54. In various exemplary embodiments of the present invention, the two displays 52 and 54 are independently capable of reflowing reflow objects contained therein. For example, the first display 52 in FIG. 3D is the same size as the original display 43 of FIG. 3A and thus shows the identical textual content as the original display 43. The second display 54 shows a different portion of the textual content from the first display 52, and further in a different scale as compared to the scale shown in the first display 52. This is the result of rendering the reflow objects corresponding to the textual content different, such in response to, for example, a user request to zoom up the displayed textual content shown in the second display 52.

Figure 4A:
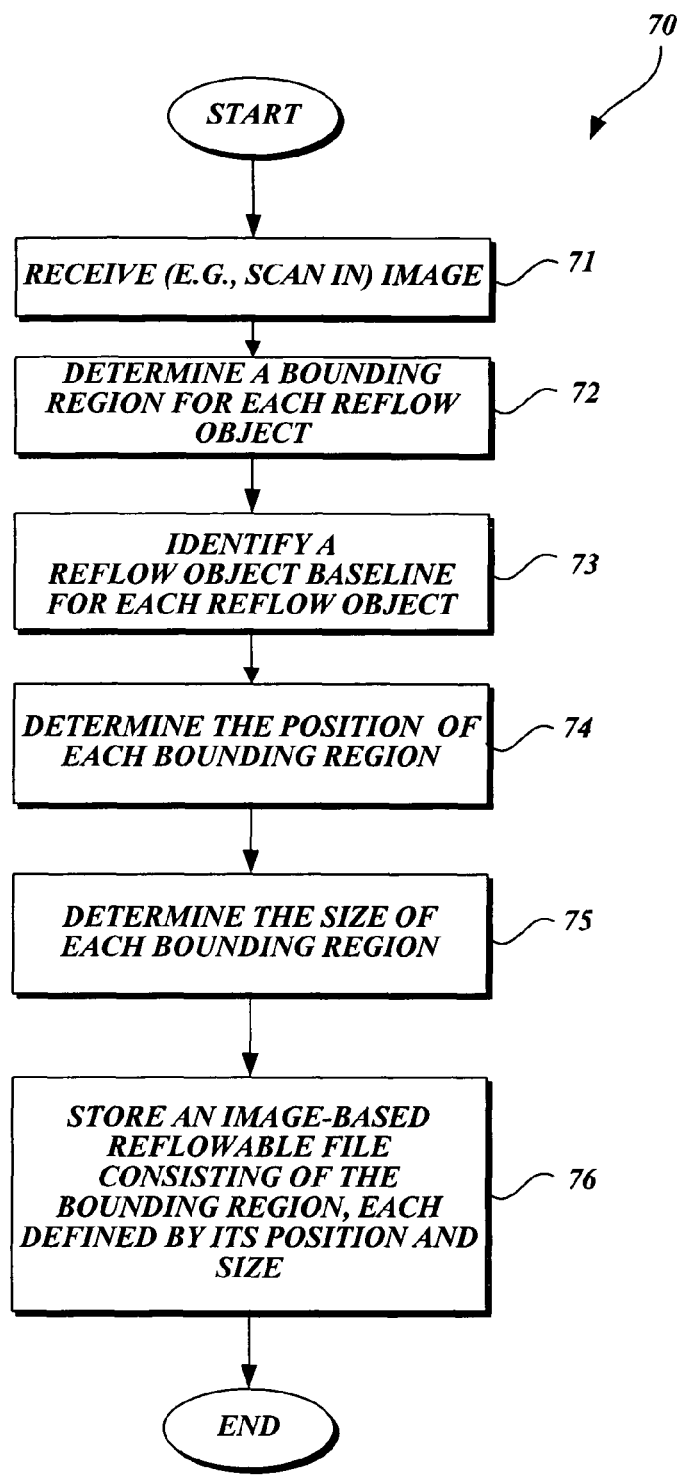
FIG. 4A is a flow diagram of an exemplary method for generating an image-based reflowable file according to one embodiment of the present invention.

FIG. 4A depicts an exemplary method 70 implemented by a reflowable file generation application 31 for generating an image-based reflowable file according to one embodiment of the present invention. The method 70 begins at block 71 by receiving an image of content having one or more reflow objects therein. The format of the received images may vary, and can include images in an-accessible format, such as in an Adobe® Portable Document File (PDF), or in a non-accessible format, such as in a JPEG, TIFF, GIF, or BMP format file. In an illustrative embodiment, the image may correspond to scanned images of printed materials. Alternatively, the image may correspond to electronic documents generated by various software applications or converted by third-party software components.

The received image may be implicitly associated with an "original" display size. For example, as shown in FIG. 3A above, it is often desirable to display a page image in the same format as it appears in the original print so as to maintain the original "look and feel" of the original print version of the content. The original display size, as used herein, refers to the size of a display that is capable of rendering a page image in the same format as the original print version of the content.

At block 72, the reflowable file generation application 31 determines a bounding region for each reflow object in the image of content. In an illustrative embodiment, the bounding region for each reflow object can correspond to various geometric shapes including, but not limited to, rectangles, circles, curves, ovals, triangles and more complex polygonal shapes. The reflowable file generation application 31 may select a shape for the bounding region based numerous factors such as type of output media, specific attributes of a selected output media, and/or specific attributes of certain reflow objects. For example, the reflowable file generation application 31 may select a different bounding region for a computer display as opposed to print media. In another example, the reflowable file generation application 31 may select a different bounding region for a rectangular-shaped display screen as opposed to an oval-shaped display screen. In a further example, the reflowable file generation application 31 may select complimentary bounding region for related reflow objects that may be associated with special spacing and/or formatting, such as reflow objects corresponding to the parts of a hyphenated word.

At block 73, the reflowable file generation application 31 identifies a reflow object baseline for each of the reflow objects in the image. Then, at block 74, the reflowable file generation application 31 determines the position of each bounding region relative to the image as originally received and also relative to its corresponding reflow object baseline. At block 75, the size of each bounding region is determined. In an illustrative embodiment, the reflowable file generation application 31 can utilize various mathematical models to determine the bounding region size. Referring additionally to FIGS. 5 and 6A-6E, the concept of bounding regions, reflow object baselines, and the position and size of each bounding region will be described in greater detail.

Figure 5:
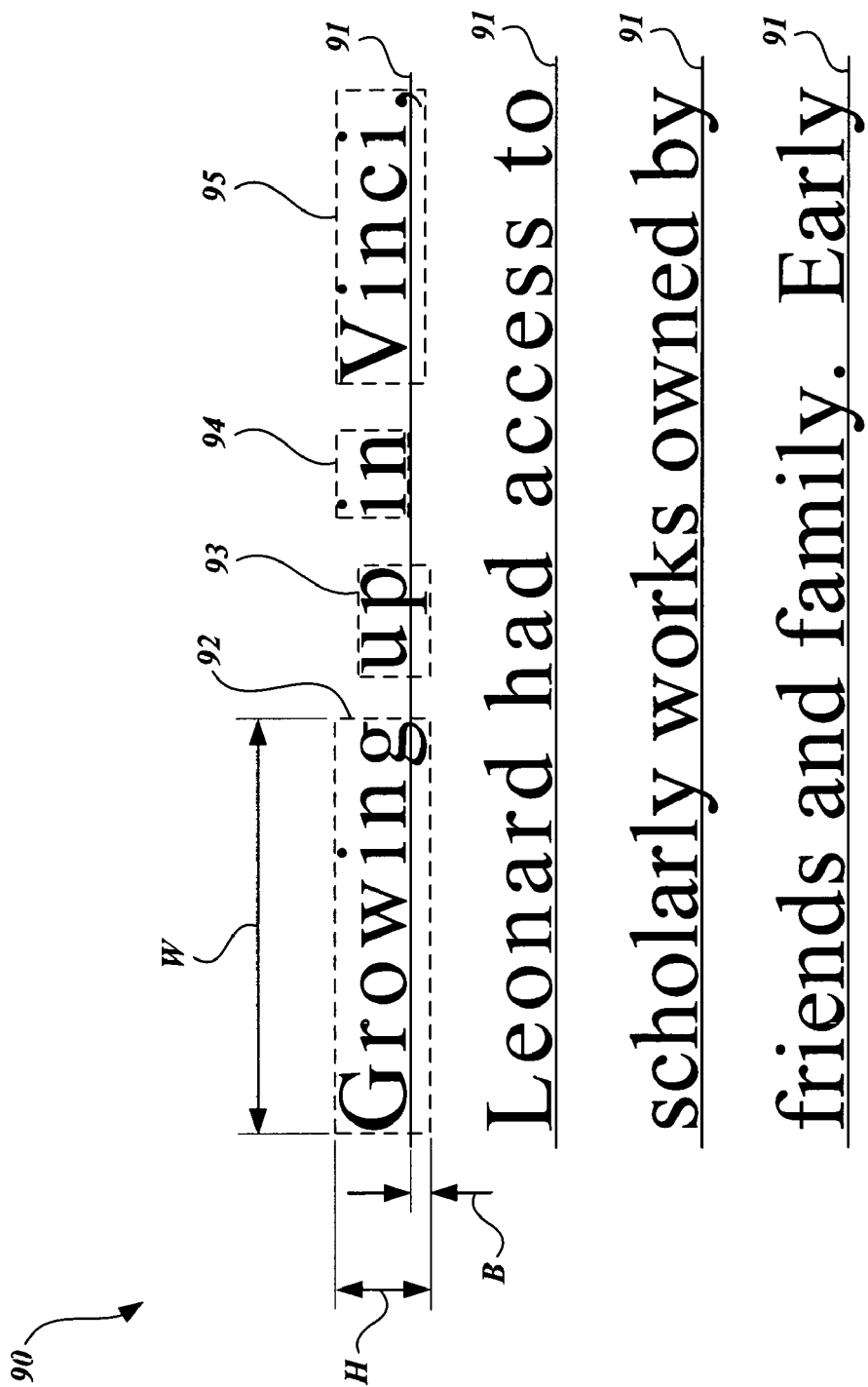
FIG. 5 illustrates the concept of per-line baselines and bounding regions that each contain a reflow object.

In FIG. 5, for the received textual content 90, four "per-line" baselines 91 are found, which are different from reflow object baselines to be described in detail below. Generally, a per-line baseline is found to coincide with the bottom lines of the majority of reflow objects appearing in a line on an output media (e.g., display), while a reflow object baseline is found to coincide with the bottom lines of the majority of characters appearing in a single reflow object. Still referring to FIG. 5, on the first per-line baseline 91, bounding regions in the form of different sized rectangular shapes 92-95 are found for containing reflow objects, "Growing," "up," "in," and "Vinci," respectively. In an illustrative embodiment, the bounding region is found to bound a relatively to the text characters that are encompassed in each reflow object. Both the per-line baselines and the bounding regions may be readily found using a suitable OCR or OCR-like software program stored in the memory 22 of the reflowable file generation server 10 (FIG. 2A).

Figure 6A:
FIGS. 6A and 6E illustrate the concept of reflow object baselines and how they can be derived from per-character baselines.
Figure 6B:

As illustrated in FIG. 6A, however, per-line baselines as determined by OCR or OCR-like software are often tilted (for example due to a scanned image that is tilted) and thus do not correctly coincide with the bottom lines of the majority of characters appearing in a line of text. In FIG. 6A, line 100 represents a true per-line baseline for the text "The quick brown fox," while line 102 represents an erroneous per-line baseline as determined by OCR or OCR-like software. The OCR-determined per-line baseline 102 is slightly tilted from the true per-line baseline 100. In the illustrated example, the OCR-determined per-line baseline 102 is above the true per-line baseline 100 at the leftmost word, "The" but is below the true per-line baseline 100 at the rightmost word, "fox." Therefore, as illustrated in FIG. 6B, if such OCR-determined erroneous per-line baselines are used to render multiple lines of text, which have true per-line baselines 100 and 100', respectively, in a single line, the rendered text does not appear as aligned properly along a horizontal line. Therefore, an OCR-determined per-line baseline cannot be reliably used to estimate a true "reflow object" baseline, which generally coincides with the bottom lines of the majority of characters appearing in a reflow object.

Figure 6C:
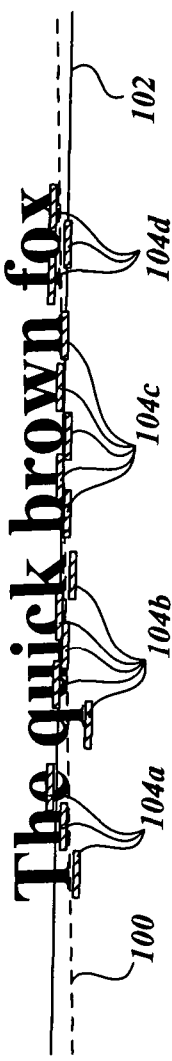

As illustrated in FIG. 6C, OCR or OCR-like software may also identify "per-character" baselines 104a-104d. Generally, a per-character baseline is found to coincide with the bottom line of a single character, such as an alphanumeric letter. As shown in FIG. 6C, however, OCR-determined per-character baselines 104a-104d typically have a large amount of jitter along a line including a plurality of reflow objects. Therefore, though the per-character baselines for the characters on any given line may average to the OCR-determined per-line baseline, the amount of variance (or jitter) is too great to be used for estimating a true "reflow object" baseline.

According to various exemplary embodiments of the present invention, a true reflow object baseline is identified based on finding a fitting function that smoothly estimates the position of each of the per-character baselines along a line, including a plurality of reflow objects, with a minimum average error. Any fitting function may be used, including, but not limited to, a linear or polynomial regression. The fitting function can then be used to identify a substantially true reflow object baseline for each of the reflow objects along the line by plugging in the average value across each of the reflow objects to the fitting function. For example, if a fitting function is found to be: y=0.3x+1200, and there are four reflow objects along a line whose horizontal center points are at x=500, 1200, 1900, and 2600, respectively, then the reflow object baseline values along the vertical y axis for these four reflow objects can be calculated as y=1350, 1560, 1770, and 1980, respectively. The y values calculated according to the fitting function find reflow object baselines for the reflow objects along a line, wherein each of the found reflow object baselines has a minimum amount of error (distance) relative to its corresponding portion of the true per-line baseline.

Figure 6D:
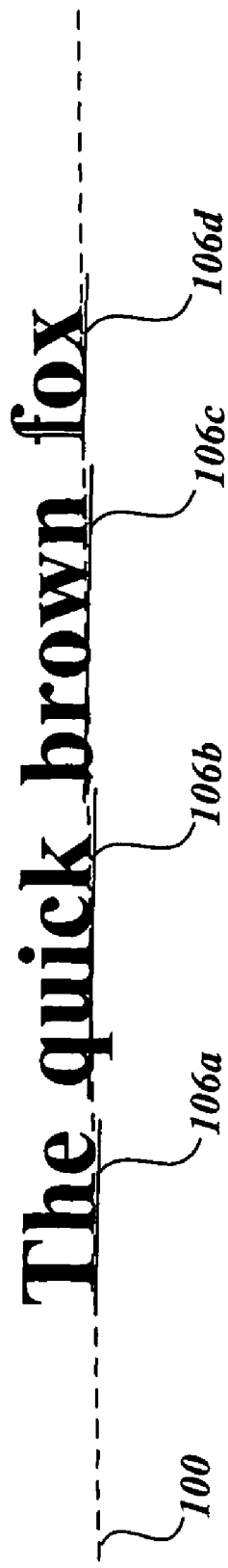

FIG. 6D illustrates four "reflow object" baselines 106a, 106b, 106c, and 106d for the four reflow objects, "The," "quick," "brown," and "fox," respectively, as found using a fitting function according to a method of the present invention. As shown, each of the reflow object baselines 106a-106d closely matches the true per-line baseline 100, and hence its corresponding portion of the true per-line baseline 100 (i.e., its true "reflow object" baseline).

Figure 6E:

FIG. 6E illustrates four reflow objects as rendered on a horizontal line 104 on a display, by aligning each of the reflow object baselines 106a-106d determined above with the horizontal line 104. As shown, all of the four reflow objects appear properly when rendered on the horizontal line 104 with their corresponding reflow object baselines 106a-106d aligned therewith. Such proper rendering is possible according to a method of the present invention because the error caused by any tilting of the original image is distributed across the entire line of reflow objects, as opposed to all of the error occurring at both ends of the line as shown in FIGS. 6A and 6B.

In the case of extreme jitter, a method of finding reflow object baselines for reflow objects can be further refined by first finding a fitting function, then finding the standard deviation of the distance of all letters (characters) to the fitting function, and finding a fitting function that best approximates all the letters within one standard deviation of the original fitting function. Fitting function techniques remove superscripts, subscripts, footnote indicators, mathematical symbols, hyphens, and other similar non-baseline-conforming letters and symbols from consideration, thereby bringing the determined reflow object baselines even closer to the true per-line baseline 100.

Referring back to FIG. 5, the position of each of the bounding regions 92-95 can be determined relative to the original image, for example in terms of the x-y coordinates of one or more corner points of the bounding region. Further, the position of each bounding region relative to its corresponding reflow object baseline can be defined in terms of an offset distance "B" from the reflow object baseline (coinciding with the per-line baseline 91 in FIG. 5) to the bottom side of the bounding region (see bounding region 92). Further, in the illustrative example, because each bounding region is rectangular in shape, the size of each bounding region can be defined in terms of the height "H" and width "W" of the bounding region. The position and size (e.g., height and width) of a bounding region may be determined using any suitable units of measure, such as inches, centimeters, numbers of pixels, etc., that extend over a spatial dimension.

Referring back to FIG. 4A, at block 76, the reflowable file generation application 31 stores the position and the size of each of the bounding region, thereby forming an image-based reflowable file. Specifically, the position of each bounding region relative to the original display image (or the original display size), defined for example in terms of X-Y coordinates, and relative to its corresponding reflow object baseline, defined for example in terms of an offset distance "B" as shown in FIG. 5, is stored, together with the size of each bounding region. The file may be stored in any one of a number of computer-readable formats that have been developed for storing image data, including, but not limited to JPEG, TIFF, GIF, and BMP formats. In an alternative embodiment, the reflowable file generation application 31 can output the reflowable file directly to another computing device or to a network-based destination.

It should be appreciated by one skilled in the art that various methods of defining the position and size of each bounding region are possible. For example, the size of each bounding region may be defined explicitly by using its width and height, as described above, or implicitly by using mathematical formulae that are representative of the size, such as vector-based formulae. The position of each bounding region relative to the original image or the original display size may be defined absolutely, for example in terms of X-Y coordinates, or relatively with respect to the positions of adjacent bounding region (e.g., the location of the immediately preceding bounding region).

Figure 4B:
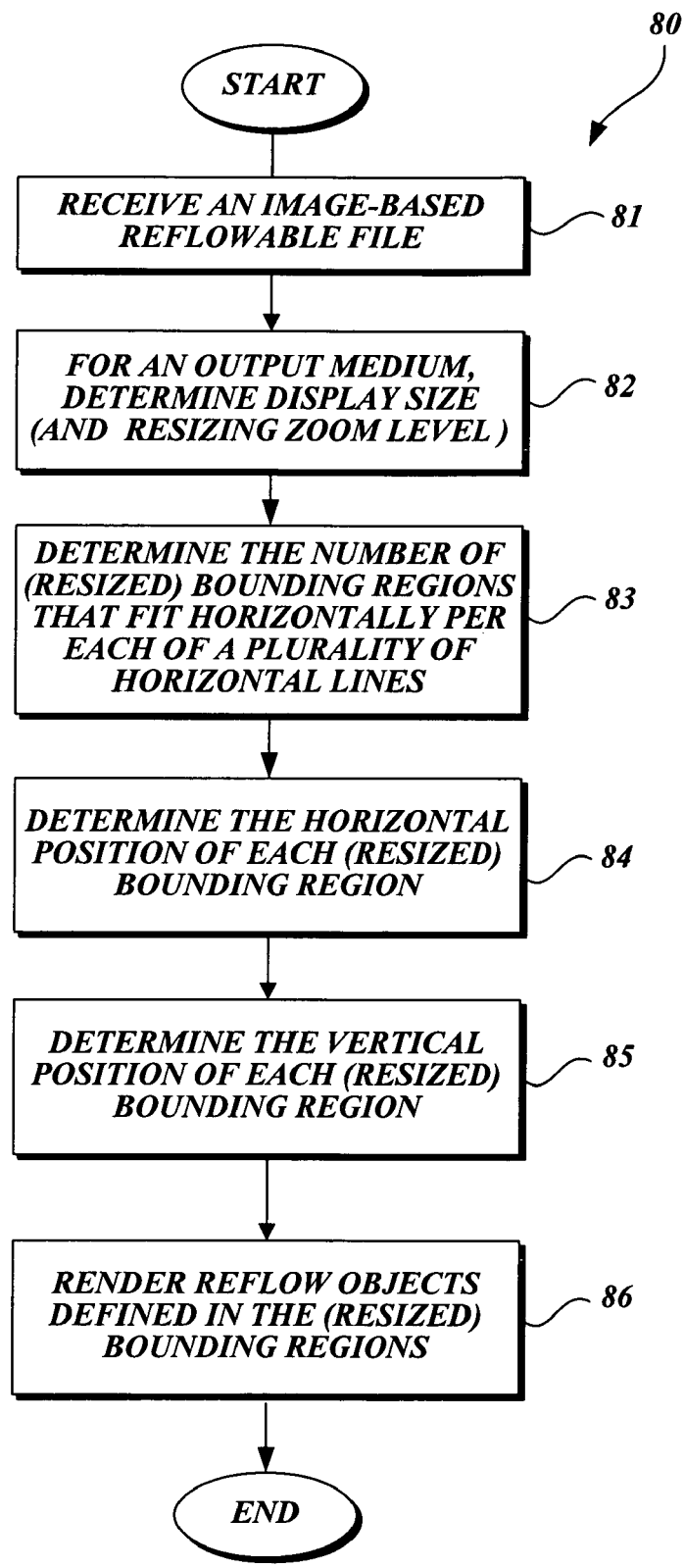
FIG. 4B is a flow diagram of an exemplary method for rendering an image-based reflowable file on a display or window of any given size according to one embodiment of the present invention.

FIG. 4B depicts an exemplary method 80, which may be implemented by a viewer program 42 in the memory 33 of the client system 12, for rendering an image-based reflowable file created in accordance with the present invention. As previously described, in an illustrative embodiment, the reflowable file may be rendered on an output media such as on a display or window of any given size, such as the display device 35 of the client system 12. Additionally, the reflowable file may be rendered on other output media such as print media. The method 80 begins at block 81 by receiving an image-based reflowable file. In the image-based reflowable file, each reflow object contained in the image forms a sub-image and is defined in a bounding region. Further, the size and the position of each bounding region are defined in the reflowable file. Further, a reflow object baseline for each of the reflow objects may be defined.

At block 82, the viewer program 42 determines the size of the output media on which the reflowable file is to be rendered. The display size may be defined by the output media's shape and dimensions, such as the shape and dimension of a display screen. If the output media size is the same, or substantially the same, as the original display/window size for which the image-based reflowable file was created, then the reflowable file may be rendered using the position and the size of each of the bounding region as defined in the reflowable file. If, on the other hand, the output media size is smaller, larger, or substantially different from the original display/ window size, then, the viewer program 41 can "reflow" the reflow objects in the reflowable file.

Specifically, at block 83, the number of bounding regions that fit horizontally per each of a plurality of horizontal lines in the output media with a minimum spacing between adjacent bounding regions is determined based on the horizontal dimension of the output media and the size of each bounding region. For example, given the horizontal dimension of the display/window, and the width dimension of each of the bounding region, it can be determined how many bounding regions will fit horizontally per each horizontal line in the display. In an illustrative embodiment, the viewer program 42 may associate less horizontal distance between two reflow objects having complimentary bounding regions (e.g., reflow objects corresponding to hyphenated words). At block 84, the horizontal position of each bounding region relative to each horizontal line is determined. For example, the horizontal coordinates (e.g., x values) of one or more corners of the bounding regions along each horizontal line may be determined.

At block 85, the viewer program 41 determines the vertical position of each of the bounding regions that fit horizontally per each horizontal line is based on the size of the bounding region. For example, given the vertical dimension of the display/window, and the height dimension of each of the bounding regions, the viewer program 41 can determine how to vertically and consistently space apart the bounding regions that fit horizontally along a plurality of horizontal lines on the display. As a further specific example, this can be accomplished by first determining the vertical position of each of the plurality of horizontal lines on the display based on the size of the display (e.g., by dividing the vertical dimension of the display by a minimum spacing) and by determining the vertical position of each bounding regions so as to align the reflow object baseline of the bounding region with the corresponding horizontal line. The minimum spacing between the plurality of horizontal lines on the display may be predefined so as to ensure the minimum size of the rendered content to be legible. As another example, the vertical dimension of the display/window may be divided by the same spacing as the original display/window to maintain the same look and feel of the original content. In an additional embodiment, the viewer program 41 may also take into account certain portions of the output media in which content may not be rendered. Still further, the viewer program 41 may also take into account any content that may not be properly reflow content, such as charts, graphs, pictures, illustrations, mathematical equations, software code listings, poetry, headers/footers, etc.

Lastly, at block 86, the bounding regions, and hence the reflow objects contained therein, are rendered according to the determined horizontal and vertical positions of the bounding regions.

In various exemplary embodiments, the bounding regions, and hence the reflow objects contained therein, may be justified along each horizontal line on the display. Specifically, after the number of bounding regions that fit horizontally per each horizontal line is found, with a minimum spacing between adjacent bounding regions, if there is remaining space along the horizontal line, the remaining space can be distributed appropriately. For example, in the case of right justification, the remaining space may be removed from the end (e.g., the right-most portion) of the horizontal line and inserted at the beginning of the horizontal line before the first (e.g., left-most) reflow object (or the bounding region) appearing on the horizontal line. In the case of center justification, one half of the remaining space may be removed from the end of the horizontal line and inserted at the beginning of the horizontal line. In the case of full justification, the remaining space may be divided by the number of spaces between adjacent reflow objects appearing on the horizontal line (i.e., one less than the number of the reflow objects on the horizontal line), and the resulting quotient space may be inserted in each of the spaces between adjacent reflow objects.

Still referring to FIG. 4B, in a further embodiment of the present invention, a method is provided for rendering an image-based reflowable file on a display/window according to a zoom level requested by a user (reader). First, at block 82, the size of the output medium is determined as well as the zoom (or resizing) level requested by the user. At block 83, the bounding regions are resized in accordance with the requested zoom level (e.g., zoomed up or down) and the number of the resized bounding regions that fit horizontally per each of the plurality of horizontal lines is determined. For example, if a zoom up is requested, the size of each bounding region is enlarged so that a less number of bounding regions will fit horizontally per each horizontal line. On the other hand, if a zoom down is requested, the size of each bounding region is made smaller so that more bounding regions will fit horizontally per each horizontal line. In an illustrative embodiment, the viewer application 41 may adjust the size of the bounding regions directly proportional to the change in zoom level. Alternatively, the viewer application 41 can limit the adjustment of the bounding regions and/or apply different proportions to the bounding region adjustment.

At block 84, the horizontal position of each of the resized bounding regions is determined relative to the horizontal line. At block 85, the vertical position of each of the resized bounding regions is determined. For example, if the user requests to zoom in on text (e.g., reflow objects) shown in the display/window, then the bounding regions are enlarged, and hence horizontal lines on the display may be further spaced apart proportionately to the requested level of zoom in so as to accommodate the enlarged bounding regions. If the user requests to zoom out, then the horizontal lines are condensed (e.g., arranged closer together) proportionately to the requested level of zoom out.

Finally, at block 86, the enlarged bounding regions, and hence the sub-images of the reflow objects defined in the enlarged bounding regions, are rendered on the output medium according to the determined horizontal and vertical positions of the resized bounding regions.

While illustrative embodiments of the invention have been illustrated and described, it will be appreciated that various changes can be made therein without departing from the spirit and scope of the invention.

We claim:

1. A system for generating an image-based reflowable file, comprising:
 a data store for storing image-based reflowable files; and
 a computing device in communication with the data store that is operative to:
  retrieve an image of content having one or more reflow objects,
  wherein the image of content corresponds to an image of printed textual content and wherein the reflow objects corresponds to the textual content;
  identify a horizontal reflow object baseline for each of reflow objects by: (a) identifying a per-character baseline for each character represented in each of the reflow objects appearing in a line, and (b) combining the per-character baselines included in the reflow objects appearing in the line to generate a horizontal reflow object baseline for each of the reflow objects;

identify polygonal-shaped bounding regions for the reflow objects;

determine the size of each polygonal-shaped bounding region;

determine the position of each polygonal-shaped bounding region relative to the image and relative to its corresponding horizontal reflow object baseline, wherein the position of each polygonal-shaped bounding region relative to its corresponding horizontal reflow object baseline is defined by an offset distance between a side of the polygonal-shaped bounding region and the horizontal reflow object baseline;

generate the image-based reflowable file comprising the horizontal reflow object baselines and the size and the position of each of the polygonal-shaped bounding regions;

store the generated image-based reflowable file in the data store; and render the image-based reflowable file on a computer display.

2. The system of claim 1, wherein the image of content corresponds to a scanned image of the printed textual content.

3. The system of claim 1, wherein at least one of the one or more reflow objects corresponds to a word of textual content.

4. A computer-implemented method for creating an image-based reflowable file, the method comprising:

obtaining an image of content having reflow objects, wherein the image of content corresponds to an image of printed textual content and wherein the reflow objects corresponds to the textual content;

identifying polygonal-shaped bounding regions for the reflow objects;

identifying a horizontal reflow object baseline for each of the reflow objects, which further comprises: (a) identifying a per-character baseline for each character represented in each of the reflow objects appearing in a line, and (b) combining the per-character baselines included in the reflow objects appearing in the line to generate a horizontal fellow object baseline for each of the reflow objects;

determining the position of each of the polygonal-shaped bounding regions containing the reflow objects relative to the image and also relative to its corresponding horizontal reflow object baseline, wherein the position of each of the polygonal-shaped bounding regions relative to its corresponding horizontal reflow object baseline is defined by an offset distance between a side of the polygonal-shaped bounding region and the horizontal reflow object baseline;

determining the size of each of the polygonal-shaped bounding regions;

generating the image-based reflowable file comprising the horizontal reflow object baselines and the size and the position of each of the polygonal-shaped bounding regions;

storing the size and the position of each of the polygonal-shaped bounding regions in a data store;

storing the generated image-based reflowable file in the data store; and causing the image-based reflowable file to be rendered on a computer display.

5. The computer-implemented method of claim 4, wherein the polygonal-shaped bounding regions correspond to a geometric shape.

6. The computer-implemented method of claim 4, wherein the geometric shape is a rectangle and wherein the size of each of the polygonal-shaped bounding regions is defined by its width and height.

7. The computer-implemented method of claim 4, wherein the position of each of the polygonal-shaped bounding regions relative to the image is defined by the coordinates of at least one corner point of the polygonal-shaped bounding region.

8. The computer-implemented method of claim 4, wherein combining the per-character baselines included in the reflow objects appearing in the line comprises:

finding a fitting function that smoothly estimates the position of each of the per-letter baselines with a minimum average error; and inputting an average value of each of the reflow objects to the fitting function.

9. A system for generating an image-based reflowable file, comprising:

a data store for storing an image-based reflowable file; and a computing device in communication with the data store that is operative to:

retrieve an image of content containing reflow objects corresponding to textual content;

identify a horizontal reflow object baseline for each of reflow objects by: (a) identifying a per-character baseline for each character represented in each of the reflow objects appearing in a line, and (b) combining the per- character baselines included in the reflow objects appearing in the line to generate a horizontal reflow object baseline for each of the reflow objects;

identify polygonal-shaped bounding regions for the reflow objects;

determine the size of each polygonal-shaped bounding region;

determine the position of each polygonal-shaped bounding region relative to the image and relative to its corresponding horizontal reflow object baseline, wherein the position of each polygonal-shaped bounding region relative to its corresponding horizontal reflow object baseline is defined by an offset from distance between a side of the polygonal-shaped bounding region and the horizontal reflow object baseline;

generate the image-based reflowable file comprising the horizontal reflow object baselines and the size and the position of each of the polygonal-shaped bounding regions;

store the generated image-based reflowable file in the data store; and cause the image-based reflowable file to be rendered on a computer display.

10. The system of claim 9, wherein the operation to retrieve an image of content therein comprises receiving the image of content from a source.

11. The system of claim 10, wherein the image is embodied in a file.

12. The system of claim 10, wherein the source comprises an input device selected from the group consisting of a video camera, a scanner, a digital camera, a copier, and a scanning pen.

13. The system of claim 10, wherein the source comprises a second computing device.

14. The system of claim 9, wherein the computing device is further operative to render the image-based reflowable file on a printed medium.

15. A non-transitory computer-readable storage medium having instructions encoded thereon to create an image-based reflowable file, wherein the instructions, when executed by a computing apparatus, cause the computing apparatus to:

- retrieve an image of content having one or more reflow objects, wherein the image of content corresponds to an image of printed textual content and wherein the reflow objects corresponds to the textual content;
- identify a horizontal reflow object baseline for each of reflow objects by: (a) identifying a per-character baseline for each character represented in each of the reflow objects appearing in a line, and (b) combining the per-character baselines included in the reflow objects appearing in the line to generate a horizontal reflow object baseline for each of the reflow objects;
- identify polygonal-shaped bounding regions for the reflow objects;
- determine the size of each polygonal-shaped bounding region;
- determine the position of each polygonal-shaped bounding region relative to the image and relative to its corresponding horizontal reflow object baseline, wherein the position of each polygonal-shaped bounding region relative to its corresponding horizontal reflow object baseline is defined by an offset distance between a side of the polygonal-shaped bounding region and the horizontal reflow object baseline;
- generate the image-based reflowable file comprising the horizontal reflow object baselines and the size and the position of each of the polygonal-shaped bounding regions;
- store the generated image-based reflowable file in a data store; and
- cause the image-based reflowable file to be rendered on a computer display.

16. The non-transitory computer-readable storage medium of claim 15, wherein the image having one or more reflow objects comprises an image of a page scanned from a printed document.

17. The non-transitory computer-readable storage medium of claim 15, wherein the position of each of the polygonal-shaped bounding regions is further defined the coordinates of at least one corner point of the polygonal-shaped bounding region.

* * * * *